Patented July 6, 1954

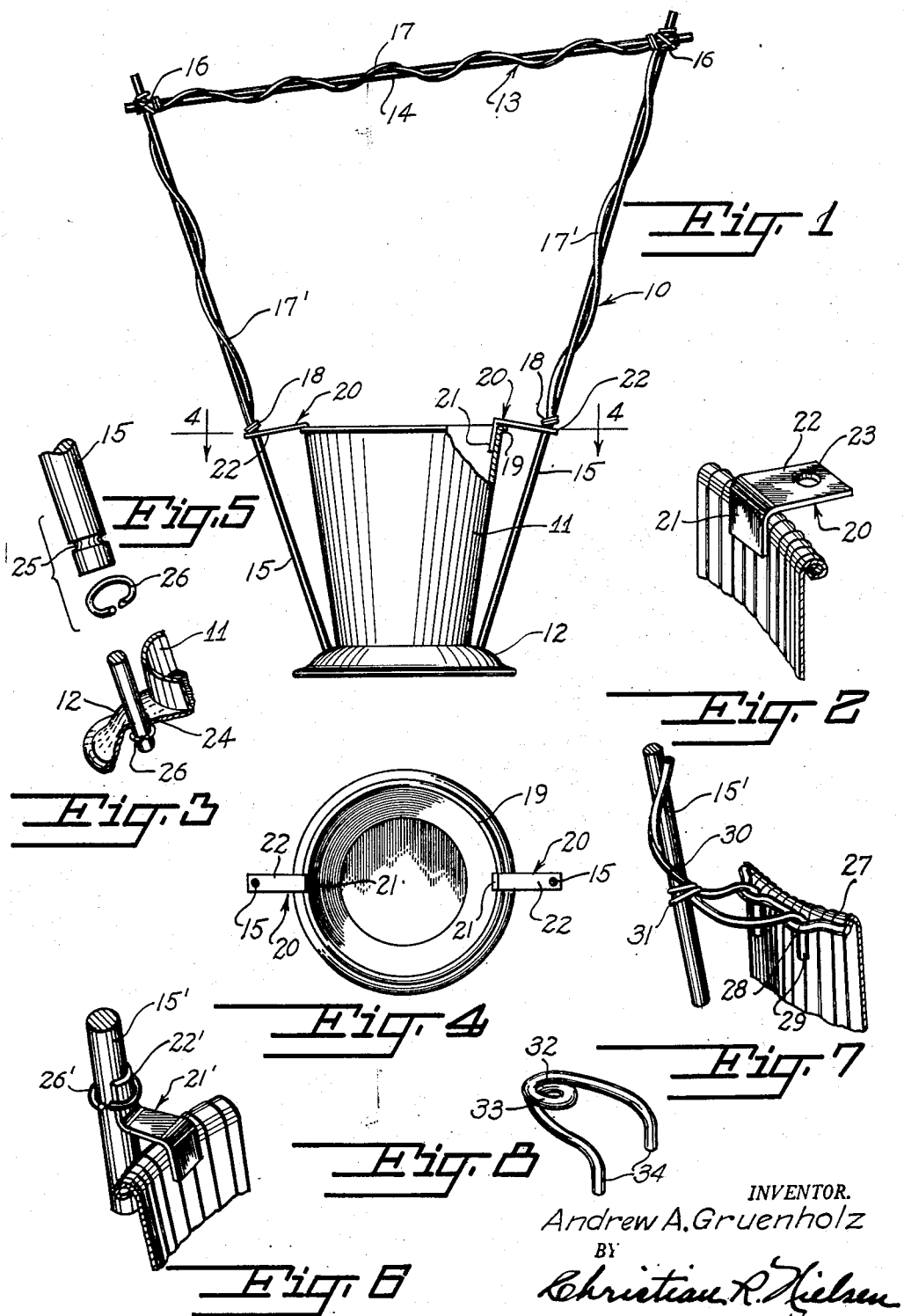

2,682,971

UNITED STATES PATENT OFFICE 2,682,971

FLORAL BASKET

Andrew A. Gruenholz, Terre Haute, Ind.

Application June 2, 1950, Serial No. 165,712

1 Claim. (Cl. 220—69)

This invention relates to a floral basket and it consists in the constructions, arrangements and combinations herein described and claimed.

It is an object of the invention to provide a novel construction of connecting means between a handle portion and the base of the flower holding receptacle, which is of simple and sturdy construction.

More particularly, it is an object of the invention to provide a flower holding receptacle wherein the base is in the form of an inverted cup-shaped member having a pair of diametrically positioned openings through which respective rods of a handle member are disposed, the lower ends of the rods being formed with an annular kerf, receiving a C-ring beneath the under surface of the cup member, thereby retaining the rods against withdrawal, the receptacle having means for engaging an intermediate portion of the rods to provide a proper balance between the rods and the receptacle to permit carrying thereof.

Additional objects, advantages and features of invention will be apparent from the following description considered in conjunction with the accompanying drawing, wherein, Figure 1 is a side elevation of a floral basket constructed in accordance with the invention, a portion of the receptacle being broken away.

Figure 2 is a fragmentary perspective view of the intermediate support for rod members of the handle.

Figure 3 is a fragmentary perspective view of the securing means between the rods of the handle and the base of the receptacle.

Figure 4 is a cross section on the line 4—4 of Figure 1.

Figure 5 is a fragmentary perspective view of the securing means between the rods and the base of the receptacle.

Figures 6 to 8 are fragmentary perspective views of modified forms of the intermediate support for the rods of the handle.

Attention is invited to Figure 1 of the drawing, wherein there is shown a floral basket 10 comprising a flower holding receptacle 11 having an inverted cup-shaped base 12. The receptacle 11 is of watertight construction and the base 12 is rigidly connected thereto and is of a diameter greater than that of the receptacle so as to afford ample support to the latter, especially when the receptacle is in use and supports long stemmed flowers.

A handle 13 is employed in conjunction with the base and receptacle and comprises a hand grip 14 and a pair of rods 15, the upper ends of which lie in crossed relation to the member 14 and connected thereto by a wrapping 16, this wrapping also securing the ends of a strand 17 entwined around the member 14. The rods 15 also include a strand 17' entwined thereupon, the strands terminating at points approximately the height of the receptacle and secured as at 18.

The rods 14 and 15 are formed from stock dowel material and the strands 17 and 17' may be formed from rattan, although plastic strands may be employed and in the latter event, the basket may be made quite ornamental by the use of colored plastics.

Upon the rim 19 of the receptacle a pair of supports 20 are secured positioned at diametrically opposite sides of the receptacle, each support being of L-shaped formation, the short leg 21 of which is secured to the inside wall of the receptacle, the long leg 22 extending outwardly beyond the periphery of the receptacle. Each leg 22 is provided with an opening 23 of a diameter to receive a rod 15 therethrough.

The base 12 is also formed with an opening 24 in alignment with respective openings 23 of the support and likewise is of a diameter to receive the lower end of the rods 15 therethrough as clearly shown in Figure 3.

The lower ends of the rods 15 are formed with an annular kerf 25 within which a C-ring 26 is engaged, the ring 26 having a thickness so as to overlie the openings 24 of the base 12 and thus retain the rods 15 against withdrawal.

In assembling the handle upon the receptacle 11, the rods 15 are passed through the openings 23 of the supports 20 and through the openings 24 of the base 12. The rods 15 may be moved beyond the base line of the cup-shaped member 12 to present the kerf 25 at a convenient position to secure the C-ring 26 in the kerf. The rods are then drawn upwardly so as to bring the rings into engagement with the underface of the base, when the basket may be carried as is customary. Obviously the handle 13 may be readily released from the receptacle by removal of the C-rings 23 from the kerfs 25.

In Figure 6, a modified form of support is shown in which the support 21' is of substantially Z-shaped formation, the leg 22' being of semi-circular form adapted to partly embrace the rod 15', a C-ring 26' being engageable about the rod and leg 22' to secure the two together.

In Figure 7 a further form of support is disclosed in which a rod 27 is welded to the exterior wall of the receptacle, the rod having semi-circular eyelets 28 into which respective terminal ends 29 of strands 30 are positioned. The strands 30 are secured to the rods 15' as at 31.

The form shown in Figure 8 is adapted for use in connection with the support rod of Figure 7, and in this instance, a wire is bent intermediate its length to form a helix 32 forming an opening 33 through which the rod 15' may pass. The ends of the wire are bent at right angles to the helix to form respective legs 34 adapted to engage in the eyelets 28.

While I have shown and described preferred forms of the device, this is by way of illustration only, and I consider as my own, all such modifications in construction as fairly fall within the scope of the appended claim.

I claim:

In a floral basket, a flower holding receptacle having an inverted cup shaped base member, said receptacle being provided with an outer annular bead on its upper end, said base member being of greater diameter than said receptacle and being hollow, said base member having an open bottom, a handle including a pair of angularly arranged rods, a hand grip extending between the upper ends of said rods and connected thereto, a pair of L-shaped support members arranged at diametrically opposite sides of said receptacle, each of said support members including a short leg secured to the inside wall of the receptacle, and a long leg extending outwardly over and beyond the bead of the receptacle, each of said long legs being provided with an opening for slidably receiving said rods, said base member being provided with a pair of diametrically opposed openings for slidably receiving the lower ends of said rod, the openings in said base member being arranged in alignment with the openings in the long leg of said support members, each of said rods being provided with an annular kerf positioned within said hollow base member, and a C-ring releasably positioned in each kerf and arranged below the upper surface of the base member, the diameter of the openings in the base member being less than the diameter of said C-ring.

References Cited in the file of this patent

UNITED STATES PATENTS

| Number | Name | Date |
|---|---|---|
| 1,237,093 | Priddy | Aug. 14, 1917 |
| 1,655,147 | Kramer | Jan. 3, 1928 |
| 1,786,062 | Gruenholz et al. | Dec. 23, 1930 |
| 1,881,864 | Nash | Oct. 11, 1932 |
| 1,979,771 | Potter | Nov. 6, 1934 |
| 2,002,582 | Potter | May 28, 1935 |
| 2,456,355 | Aber | Dec. 14, 1948 |
| 2,592,692 | Hattenbach | Apr. 15, 1952 |